April 17, 1962  L. R. MARTEIL  3,029,515
EQUIPMENT FOR CHECKING THE WHEELS OF MOTOR VEHICLES
Filed March 30, 1956
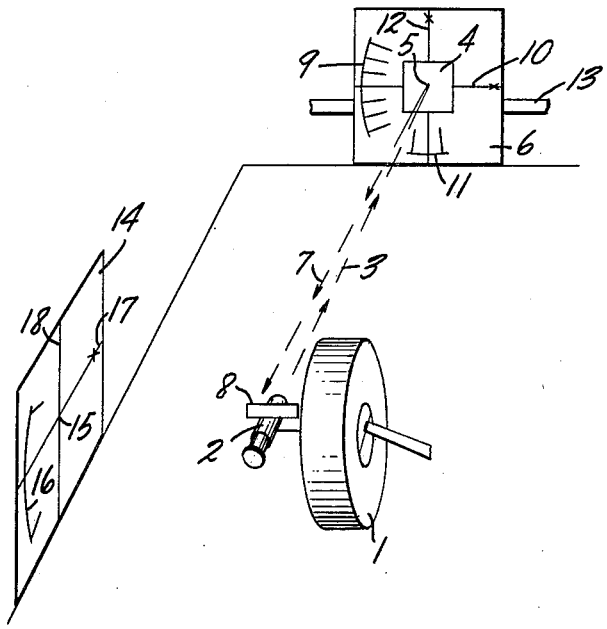
INVENTOR.
LUCIEN ROBERT MARTEIL
BY Squire & Olcott
his ATTORNEYS United States Patent Office 3,029,515
Patented Apr. 17, 1962

3,029,515
EQUIPMENT FOR CHECKING THE WHEELS OF MOTOR VEHICLES
Lucien Robert Marteil, Harfleur, France
Filed Mar. 30, 1956, Ser. No. 575,053
Claims priority, application France Mar. 31, 1955
1 Claim. (Cl. 33—46)

It is known that motor vehicles have their wheels mounted on their axles at certain critical angles in order to give them good road-holding capacities.

For checking and verifying these various angles, various appliances are already known, but these appliances have the disadvantage of requiring delicate and prolonged measurements. Furthermore, these appliances are complicated.

A primary object of the invention is to provide checking equipment which is simple and by which the wheels of vehicles may be speedily checked.

Another object of the invention is to provide checking equipment of the kind mentioned, which permits, with a minimum amount of handling, the checking of the various characteristic positions or angles of the wheels to be analyzed.

Another object of the invention is to provide equipment that will enable all desirable checks to be made without raising the vehicle from the ground.

Another object of the invention is to provide equipment whose various components may be stowed in a small space when not in use.

Other objects of the invention will be revealed in the following specification together with the accompanying drawing forming a part hereof.

In the drawing, the single FIGURE is a perspective view illustrating an embodiment of the invention.

The vehicle is jacked up so that the front wheel 1 to be checked is about one inch above the ground. A light beam projector 2 is mounted on the wheel 1 in such a manner that it may be rotated to sweep the projected light beam 3 either in a plane perpendicular to the rotational axis of the wheel 1 or in a plane parallel thereto. As shown, the projected beam 3 is directed toward a vertical mirror 4 located at the center 5 of a vertical screen 6. The screen 6 is substantially parallel to the rotational axis of the wheel 1 and located about three feet in front of the projector 2. The mirror 4 produces a reflected light beam 7 which is directed back to a graduated scale 8 mounted on the light beam projector 2 and extending substantially perpendicular to the optical axis of the projector 2.

At one side, the screen 6 is provided with a circular arcuate scale 9 calibrated in units of angular measurement. The center of curvature of the scale 9 is located at the center 5 of the screen 6. The midpoint of the scale 8 lies on a horizontal line 10 passing through the center 5 of the screen 6.

A further circular arcuate scale 11 is located near the lower edge of ths screen 6. The center of curvature of the scale 11 is located at the center 5 of the screen 6. The midpoint of the scale 11 lies on a vertical line 12 passing through the center 5 of the screen 6.

The screen 6 is horizontally slidably mounted on a common horizontally extending supporting bar 13 together with another similar screen and mirror for the other front wheel (not shown).

A further vertical screen 14, perpendicular to the screen 6, has a center 15 located substantially on the rotational axis of the wheel 1. A circular arcuate scale 16 on the screen 14 has its midpoint located on a horizontal line 17 passing through the center 15 of the screen 14. A vertical line 18 on the screen 14 passes through the center 15 of the screen.

In operation, the projector 2 is so adjusted that light beam 3 is perpendicular to the rotational axis of the wheel and it impinges on the center 5 of the screen 6 with the wheels turned straight ahead, as shown in the drawing. By steering the wheels toward the left, with the wheels locked against rotation, the light beam will move leftwardly away from the center 5 and reach the arcuate scale 9. The king-pin inclination may then be read directly from the scale 9 the midpoint of the scale corresponding to an angle of zero. Alternatively, the wheel 1 may be unlocked and rotated forwardly on its axle to lower the beam 3 away from the center 5 so that it reaches the bottom scale 11 from which the angle of camber may be read directly, the midpoint of the scale being zero.

For reading caster, the projector is turned so that the light beam 3 is parallel to the rotational axis of the wheel and is projected leftwardly to the center 15 of the screen 14. By steering the wheel 1 toward the left, the light beam 3 will shift to the scale 16 from which the angle of caster may be read directly.

To check parallelism, the wheel 1 is so adjusted that reflected light beam 7 falls on the center of the scale 8 above the projector 2. Since the mirrors 4 of the two screens 6 are parallel and lie in vertical planes, the light beam for the other wheel (not shown) will also fall on the center of its scale 8 if the rotational axes of the two wheels are precisely parallel and there is no toe-in or toe-out. Any deviation may be read directly from the one of the scales 8 which is not adjusted for a zero reading. This measurement may be made independently of variations in the distance between the centers 5 of the two screens.

While I have shown and described what I believe to be the best embodiments of my invention, it will be apparent to those skilled in the art that various changes and modifications may be made therein without departing from the spirit and scope of the invention as defined in the appended claim.

What I claim is:

Apparatus for checking the wheel alignment of a vehicle, comprising: a light beam projector attachable to the wheel to be checked, and screen means spaced from said light beam projector and disposed substantially parallel to the rotational axis of said wheel to be checked, said screen means having on the side facing said light beam projector a graduated circular scale, said light beam projector being adapted to project light onto said graduated circular scale, reflecting means mounted substantially at the center of said screen means, and a graduated scale mounted on said light beam projector substantially perpendicular to its optical axis.

References Cited in the file of this patent

UNITED STATES PATENTS

| | | |
|---|---|---|
| 2,249,226 | Peters | July 15, 1941 |
| 2,292,968 | Peters | Aug. 11, 1942 |
| 2,292,969 | Peters | Aug. 11, 1942 |
| 2,410,339 | Creagmile | Oct. 29, 1946 |

FOREIGN PATENTS

| | | |
|---|---|---|
| 967,393 | France | Mar. 29, 1950 |
| 535,330 | Great Britain | Apr. 7, 1941 |